US011466431B2

United States Patent
Sasaki et al.

(10) Patent No.: US 11,466,431 B2
(45) Date of Patent: Oct. 11, 2022

(54) REMOTE OPERATION SYSTEM AND MAIN OPERATING DEVICE

(71) Applicant: KOBELCO CONSTRUCTION MACHINERY CO., LTD., Hiroshima (JP)

(72) Inventors: Hitoshi Sasaki, Hiroshima (JP); Seiji Saiki, Hiroshima (JP); Yoichiro Yamazaki, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 98 days.

(21) Appl. No.: 16/979,409

(22) PCT Filed: Dec. 11, 2018

(86) PCT No.: PCT/JP2018/045568
§ 371 (c)(1),
(2) Date: Sep. 9, 2020

(87) PCT Pub. No.: WO2019/181103
PCT Pub. Date: Sep. 26, 2019

(65) Prior Publication Data
US 2021/0079621 A1    Mar. 18, 2021

(30) Foreign Application Priority Data
Mar. 23, 2018    (JP) .............................. JP2018-055949

(51) Int. Cl.
*E02F 9/20*    (2006.01)
*G05D 1/00*    (2006.01)

(52) U.S. Cl.
CPC ........... *E02F 9/205* (2013.01); *G05D 1/0022* (2013.01); *G05D 2201/0202* (2013.01)

(58) Field of Classification Search
CPC .................. E02F 9/205; G05D 1/0022; G05D 2201/0202; H04Q 9/00
(Continued)

(56) References Cited

U.S. PATENT DOCUMENTS

2011/0282519 A1*  11/2011  Carlsson ................. E02F 9/205
                                                                              701/2
2015/0052591 A1*  2/2015  Miura .................. A01B 79/005
                                                                              726/4
(Continued)

FOREIGN PATENT DOCUMENTS

CN    102282321 A    12/2011
EP    3 225 750 A1    10/2017
(Continued)

OTHER PUBLICATIONS

Extended European Search Report dated Mar. 23, 2021 in corresponding European Patent Application No. 18910268.4, 6 pages
(Continued)

*Primary Examiner* — Muhammad Shafi
(74) *Attorney, Agent, or Firm* — Oblon, McClelland, Maier & Neustadt, L.L.P.

(57) ABSTRACT

A correction value for matching an operation characteristic of a slave operating device with an operation characteristic of a master operating device is registered in advance in a correction table for each combination of type information of a construction machine and type information of the slave operating device. A controller acquires, from correction information, a correction value corresponding to a combination of the type information of the construction machine and the type information of the slave operating device received by a communication unit, corrects an amount of operation accepted by an operating lever based on the
(Continued)

acquired correction value, and transmits the corrected amount of operation to the communication unit.

6 Claims, 9 Drawing Sheets

(58) Field of Classification Search
USPC .......................................................... 701/50
See application file for complete search history.

(56) References Cited

U.S. PATENT DOCUMENTS

| | | | |
|---|---|---|---|
| 2016/0224021 A1 | 8/2016 | Kuikka | |
| 2017/0016211 A1* | 1/2017 | Arimatsu | G01S 19/14 |
| 2017/0089042 A1* | 3/2017 | Machida | G06V 20/58 |
| 2018/0044893 A1* | 2/2018 | Machida | H04N 5/247 |

FOREIGN PATENT DOCUMENTS

| | | |
|---|---|---|
| JP | 10-252101 A | 9/1998 |
| JP | 10-277976 A | 10/1998 |
| JP | 2002-38528 A | 2/2002 |
| JP | 2005-204256 A | 7/2005 |
| JP | 2016-196064 A | 11/2016 |
| KR | 10-2008-0059792 A | 7/2008 |
| KR | 10-2013-0076101 A | 7/2013 |
| WO | WO 2006/028938 A1 | 3/2006 |

OTHER PUBLICATIONS

International Search Report dated Mar. 12, 2019 in PCT/JP2018/045568 filed on Dec. 11, 2018, 2 pages.

* cited by examiner

| | SLAVE SIDE | | | | MASTER SIDE | | |
|---|---|---|---|---|---|---|---|
| | CONSTRUCTION MACHINE | | SLAVE | | ATT LEVER | | TRAVEL LEVER |
| | | | | | CORRECTION VALUE/ REGULATION VALUE | | CORRECTION VALUE/ REGULATION VALUE |
| PATTERN | MANUFACTURER NAME | TYPE | MANUFACTURER NAME | TYPE | FRONT AND REAR | LEFT AND RIGHT | FRONT AND REAR |
| 1 | A COMPANY | Z1 | A COMPANY | S01 | 1.0/19 | 1.0/19 | 1.0/28 |
| 2 | A COMPANY | Z2 | C COMPANY | S02 | 0.8/19 | 0.8/19 | 1.2/28 |
| 3 | B COMPANY | Z3 | C COMPANY | S03 | 1.2/16 | 1.2/16 | 0.8/24 |
| 4 | A COMPANY | Z1 | D COMPANY | S04 | 0.8/19 | 0.8/19 | 1.2/28 |
| ... | | | | | | | |

T2

| TYPE | CLASS |
|---|---|
| Z1 | 30t |
| Z2 | 20t |
| Z3 | 7t |

T3

| | ATT LEVER | | TRAVEL LEVER |
|---|---|---|---|
| | STROKE | | STROKE |
| TYPE | FRONT AND REAR | LEFT AND RIGHT | FRONT AND REAR |
| S01 | 19 | 19 | 28 |
| S02 | 23 | 23 | 30 |
| S03 | 20 | 20 | 28 |

REMOTE OPERATION SYSTEM AND MAIN OPERATING DEVICE

TECHNICAL FIELD

The present invention relates to a remote operation system provided with a main operating device and a slave operating device, and the like.

BACKGROUND ART

In recent years, there is provided a known remote operation system which remotely operates a construction machine by using a main operating device called a master which directly accepts operation of an operator and a slave operating device called a slave which is communicably connected to the master (e.g. Patent Literature 1). The slave is a device, as a so-called dummy of an operator, which operates a construction machine at a remote place, and is a device which directly operates an operating lever of the construction machine based on an amount of operation accepted by the master from the operator. Such a remote operation system has a merit of enabling remote operation even without modifying an existing construction machine because external attachment of a slave to a construction machine enables remote operation.

Conventional remote operation systems are premised on use of a master and a slave as a set and therefore, when the system is changed to a model without a slave as a set, it is necessary to change a master accordingly.

An imitation of a toy controller for radio control had been formerly used as a master. However, this requires a lot of time to attain a skill equivalent to a skill for operating an actual construction machine. In recent years, a direct imitation of an operator seat of an actual construction machine is used. Such a master which imitates an operator seat costs a lot and requires an installation space, so that replacement is not easy.

In a case where a user having such a master asks for rental of a construction machine with a slave attached, because replacement of a master is not easy as described above, a user often designates a slave to be a set with the master owned by the user, so that a rental agent needs to prepare a plurality of kinds of slaves in advance.

Here, a system of a model having a master and a slave as a set, in which an operation characteristic of the master and an operation characteristic of the slave match with each other, is allowed to operate a construction machine according to an amount of operation input to the master. In a case, for example, where operation of making a boom have an inclination angle of 10 degrees is input, the slave is allowed to make the boom have an actual inclination angle of 10 degrees.

However, in a case of a model in which a master and a slave do not form a set, because an operation characteristic of the master does not match an operation characteristic of the slave, a construction machine might not be operated according to an amount of operation input to the master. For example, even when operation of making a boom have an inclination angle of 10 degrees is input to the master, the slave might make the boom have an actual inclination angle of, for example, 12 degrees. In this case, an operator is required to reduce or increase an amount of operation of the master so that the boom has an actual inclination angle of 10 degrees. It is therefore impossible to remotely operate a construction machine with the same operation feeling as in a case of operating an actual construction machine.

It is conceivable here to use a method of correcting an amount of operation transmitted from a master on a slave side so that a construction machine operates according to the amount of operation input to the master.

This method, however, takes a lot of labor because an operator is required to conduct work of monitoring an actual amount of working of a construction machine at a work site to adjust an amount of correction for an amount of operation while remotely operating the construction machine.

CITATION LIST

Patent Literature

Patent Literature 1: Japanese Unexamined Patent Publication No. H10-252101

SUMMARY OF INVENTION

An object of the present invention is to provide a remote operation system which, in a case where a slave operating device that is not a set with a main operating device is attached to a construction machine, can allow an operator to remotely operate the construction machine with the same operation feeling as in a case of operating an actual construction machine, without requiring troublesome adjustment work on a slave operating device side.

In order to achieve the above object, a remote operation system according to one aspect of the present invention is a remote operation system which remotely operates a construction machine provided with an operation member, the remote operation system including: a main operating device which remotely operates the construction machine; and a slave operating device communicably connected to the main operating device, in which the slave operating device includes: a first communication unit which transmits type information of the construction machine and type information of the slave operating device to the main operating device and receives an amount of operation transmitted from the main operating device; and an operating mechanism which directly operates the operation member of the construction machine based on an amount of operation received by the first communication unit, and in which the main operating device includes a second communication unit which receives the type information of the construction machine and the type information of the slave operating device transmitted from the slave operating device; a first memory which stores correction information having a correction value registered in association with a combination pattern of the type information of the construction machine and the type information of the slave operating device, the correction value being for matching an operation characteristic of the slave operating device with an operation characteristic of the main operating device; a remote operation member which accepts operation from an operator; and a controller which acquires, from the correction information, a correction value corresponding to a combination pattern of the type information of the construction machine and the type information of the slave operating device received by the second communication unit, corrects an amount of operation accepted by the remote operation member based on the acquired correction value, and causes the second communication unit to transmit the amount of operation.

According to the present invention, in a case where a slave operating device not being a set with a main operating device is attached to a construction machine, an operator is allowed to remotely operate the construction machine with

BRIEF DESCRIPTION OF DRAWINGS

FIG. 3 is a diagram showing one example of a data configuration of correction information.

DESCRIPTION OF EMBODIMENTS

Figure 1:
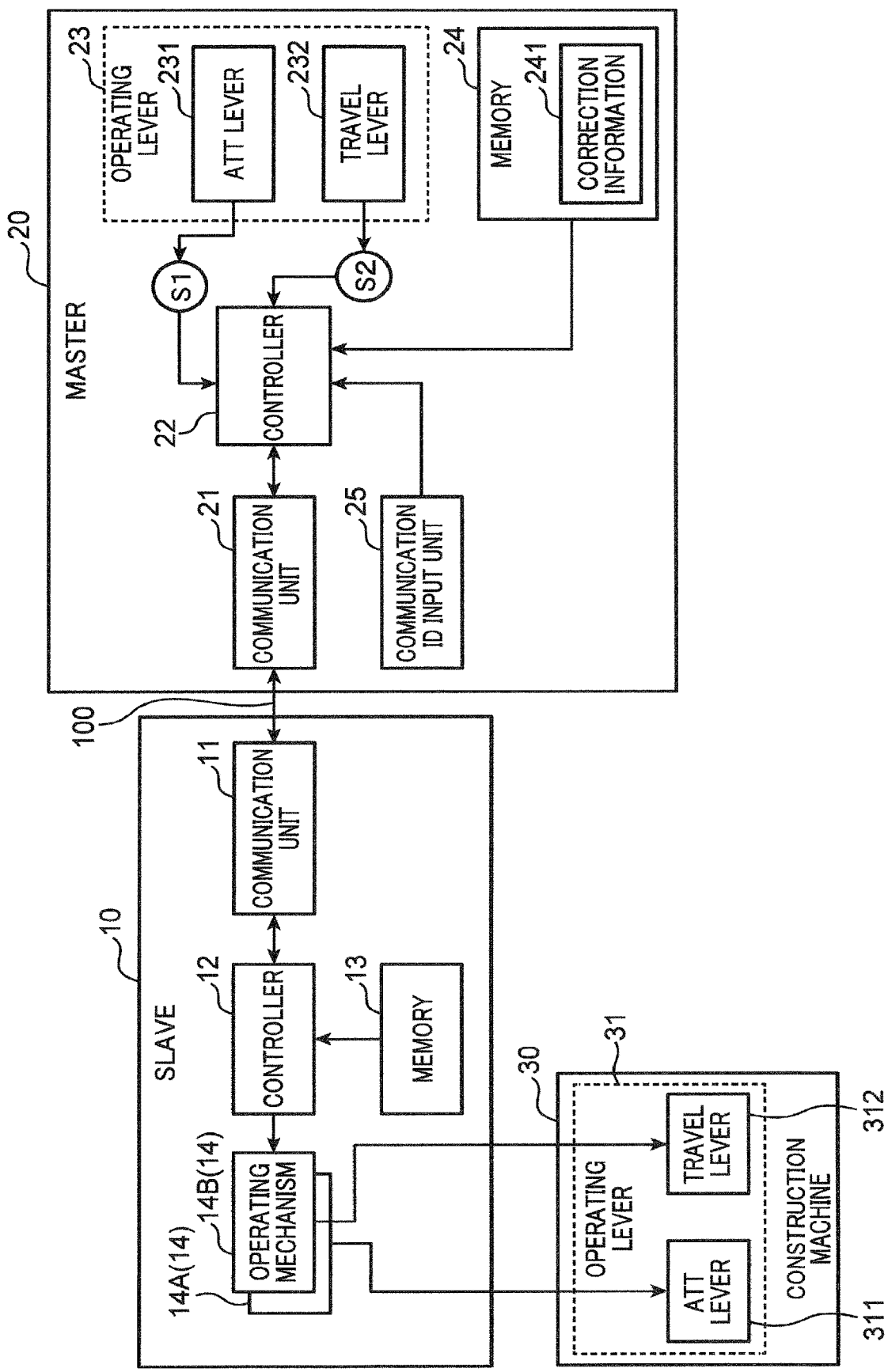
FIG. 1 is a block diagram showing an overall configuration of a remote operation system according to an embodiment of the present invention.

FIG. 1 is a block diagram showing an overall configuration of a remote operation system according to an embodiment of the present invention. The remote operation system is provided with a slave 10 and a master 20. The slave 10 is a slave operating device which is arranged at an operator seat of a construction machine 30 to directly operate an operating lever 31 of the construction machine 30 based on an amount of operation accepted by the master 20. In other words, the slave 10 is a machine which serves as a dummy of an operator to operate the construction machine 30. The master 20 is a main operating device which directly accepts operation of the operator of the construction machine 30. In the present embodiment, the master 20, which is configured with an operation device that imitates the operator seat of the construction machine 30, includes an operating lever 23 which is similar to the operating lever 31 of the construction machine 30 and is arranged at the same position as in the construction machine 30. The master 20 is provided with a seat on which the operator sits, and a large-screen monitor provided ahead of the seat for displaying video of the surroundings of the construction machine 30 whose image is picked up by a remote camera.

Figure 2:
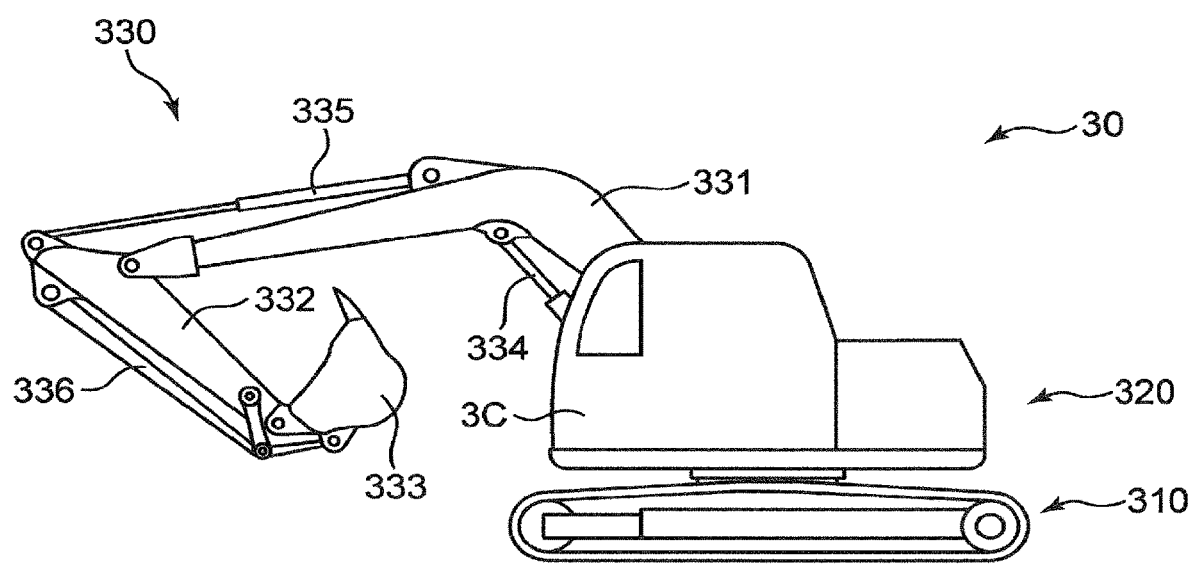
FIG. 2 is a view showing an outer appearance of a construction machine shown in FIG. 1.

The slave 10 and the master 20 are communicably connected with each other via a communication path 100. As the communication path 100, there are adopted communication paths such as specific power-saving radio and Bluetooth (registered trademark) which enable the slave 10 and the master 20 to communicate at a distance of about several tens to several hundreds of meters by radio. This is one example only and as the communication path 100, public communication lines including a cellular phone communication network, the Internet communication network, and the like may be adopted. In this case, the master 20 and the slave 10 are allowed to conduct long-distance communication, FIG. 2 is a view showing an outer appearance of the construction machine 30 shown in FIG. 1. The construction machine 30 shown in FIG. 2 is configured with a hydraulic excavator. The construction machine 30 is provided with a crawler type lower travelling body 310, an upper slewing body 320 turnably provided on the lower travelling body 310, and a work device 330 attached to the upper stewing body 320.

The work device 330 is provided with a boom 331 attached to the upper slewing body 320 so as to go up and down, an arm 332 swingably attached to a front end portion of the boom 331, and an attachment 333 swingably attached to a front end portion of the arm 332.

The work device 330 is also provided with a boom cylinder 334 which causes the boom 331 to go up and down with respect to the upper slewing body 320, an arm cylinder 335 which causes the arm 332 to swing with respect to the boom 331, and an attachment cylinder 336 which causes the attachment 333 to swing with respect to the arm 332. The upper slewing body 320 is provided with an operator seat 3C on which an operator sits.

Reference will be returned to FIG. 1. The master 20 is provided with a communication unit 21 (one example of a second communication unit), a controller 22, the operating lever 23 (one example of a remote operation member), a memory 24 (one example of a first memory), a communication ID input unit 25, and sensors S1 and S2.

The communication unit 21, which is configured with a communication device adapted to a communication method adopted by the communication path 100, receives type information of the construction machine 30 and type information of the slave 10 transmitted from the slave 10. The communication unit 21 also transmits an amount of operation accepted by the master 20 to the slave 10.

The controller 22 is configured with a computer including a processor such as CPU or ASIC and storage devices such as ROM and RAM. The controller 22 acquires, from correction information 241, a correction value corresponding to a combination pattern of the type information of the construction machine 30 and the type information of the slave 10 received by the communication unit 21, corrects an amount of operation accepted by the operating lever 23 based on the acquired correction value, and causes the communication unit 21 to transmit the corrected amount of operation.

The operating lever 23 is provided with an ATT (attachment) lever 231 and a travel lever 232. The ATT lever 231 is configured with an operating lever capable of leaning in four directions of front, rear, left, and right and accepts operation of an operator for operating, for example, the attachment 333 and the boom 331 of the construction machine 30. Here, when leaned forward, the ATT lever 231 causes the boom 331 to go down, when leaned backward, causes the boom 331 to go up, when leaned leftward, causes the attachment 333 to swing to a driver seat side, and when leaned rightward, causes the attachment 333 to swing from the driver seat to the opposite side.

The ATT lever 231 is also provided with a regulation member (not shown) which physically regulates a stroke of the ATT lever 231 according to a regulation value to be described later under the control of the controller 22. Here, the regulation member individually regulates strokes of the ATT lever 231 in each of the front, rear, left, and right directions. Stroke represents a leaning range of the operating lever 23.

The travel lever 232, which is configured with an operating lever capable of leaning in two directions of the front and the rear, accepts operation of the operator for advancing or retracting the construction machine 30. Here, when leaned forward, the travel lever 232 causes the construction machine 30 to advance, and when leaned backward, causes the construction machine 30 to retract. The travel lever 232 is also provided with a regulation member which physically regulates a stroke of the travel lever 232 according to a regulation value to be described later under the control of the controller 22. Here, the regulation member individually regulates strokes of the travel lever 232 in each of the front and rear directions.

Although in FIG. 1, the operating lever 23 has been described as a lever including the ATT lever 231 and the travel lever 232, in a case, for example, where the construction machine 30 is provided with a four-direction operating lever which operates the arm 332 in the front and rear directions and operates the upper slewing body 320 in the left and right directions, the operating lever 23 can be provided with an operating lever corresponding to such an operating lever. In other words, the operating lever 23 is provided with various kinds of operating levers corresponding to various kinds of operating levers provided in the operating lever 31 of the construction machine 30.

The sensor S1, which is configured with, for example, a potentiometric sensor, detects an amount of operation of the ATT lever 231 and outputs the detected amount of operation to the controller 22. Here, the sensor S1 individually detects amounts of operation of the ATT lever 231 in the front, rear, left, and right directions, and outputs the detected amounts to the controller 22. The sensor S1 increases an amount of operation to be detected as a leaning amount of the ATT lever 231 is increased in each of the front, rear, left, and right directions.

The sensor S2, which is configured with, for example, a potentiometric sensor, detects an amount of operation of the travel lever 232 and outputs the detected amount of operation to the controller 22. Here, the sensor S2 individually detects amounts of operation of the travel lever 232 in the front and rear directions, and increases an amount of operation to be detected as a leaning amount of the travel lever 232 is increased.

The memory 24 is configured with a non-volatile memory and stores the correction information 241. FIG. 3 is a diagram showing one example of a data configuration of the correction information 241. The correction information 241 is provided with a correction table T1, a class table T2, and a stroke table T3.

In the correction table T1, a correction value for matching an operation characteristic of the slave 10 with an operation characteristic of the master 20 is registered in advance in association with a combination pattern of the type information of the construction machine 30 (hereinafter, denoted as "type information K1") and the type information of the slave 10 (hereinafter, denoted as "type information K2").

In detail, the correction table T1 is provided with fields of "pattern", "slave side", and "master side". In the "pattern" field, a number for specifying a combination pattern of the construction machine 30 and the slave 10 is registered. The "slave side" field is provided with fields of "construction machine" and "slave". In the "construction machine" field, manufacturer names and types of the construction machine 30 are stored in association with each other. In the "slave" field, manufacturer names and types of the slave 10 are stored in association with each other. Here, the manufacturer name is a name of a company which manufactures the construction machine 30 or the slave 10 and the type is a symbol string for specifying a model of the construction machine 30 or the slave 10. The type information K1 and K2 each include a manufacturer name and a type.

The "master side" field is provided with an "ATT lever" field and a "travel lever" field. In the "ATT lever" field, a correction value and a regulation value for amounts of operation of the ATT lever 231 in the front and rear directions are registered. In the "travel lever" field, a correction value and a regulation value for amounts of operation of the travel lever 232 in the front and rear directions are registered.

The regulation value is a value for regulating a stroke of the operating lever 23 of the master 20 to, for example, 19 using the regulation member in a case where although the stroke of the operating lever 23 is 20, the slave 10 can apply only the operability coping with a stroke up to 19 to the operating lever 31 of the construction machine 30. Details of the regulation value will be described later.

In a case of a pattern "1", for example, the construction machine 30, the slave 10, and the master 20 are manufactured by A company, and the slave 10 and the master 20 are of the same set and the operation characteristics thereof match with each other. Therefore, "1" is registered as a correction value for all. However, although the ATT lever 231 has front and rear and left and right strokes of all "20", since the slave 10 copes with a stroke of up to 19 in each direction, "19" is set as the regulation value. From the same point view, although the travel lever 232 has the front and rear strokes of 0 to 30, since the slave 10 copes with a stroke of up to 28 in each direction, "28" is registered as the regulation value of the travel lever 232.

In a case of a pattern "2", while the master 20 is manufactured by A company, the slave is manufactured by C company, and the master 20 and the slave 10 are not of the same set and the operation characteristics thereof do not match with each other. Therefore, "0.8", "0.8", and "1.2" other than "1" are registered as the correction values for the ATT lever 231 and the travel lever 232. The same also applies to other patterns.

Figure 4:
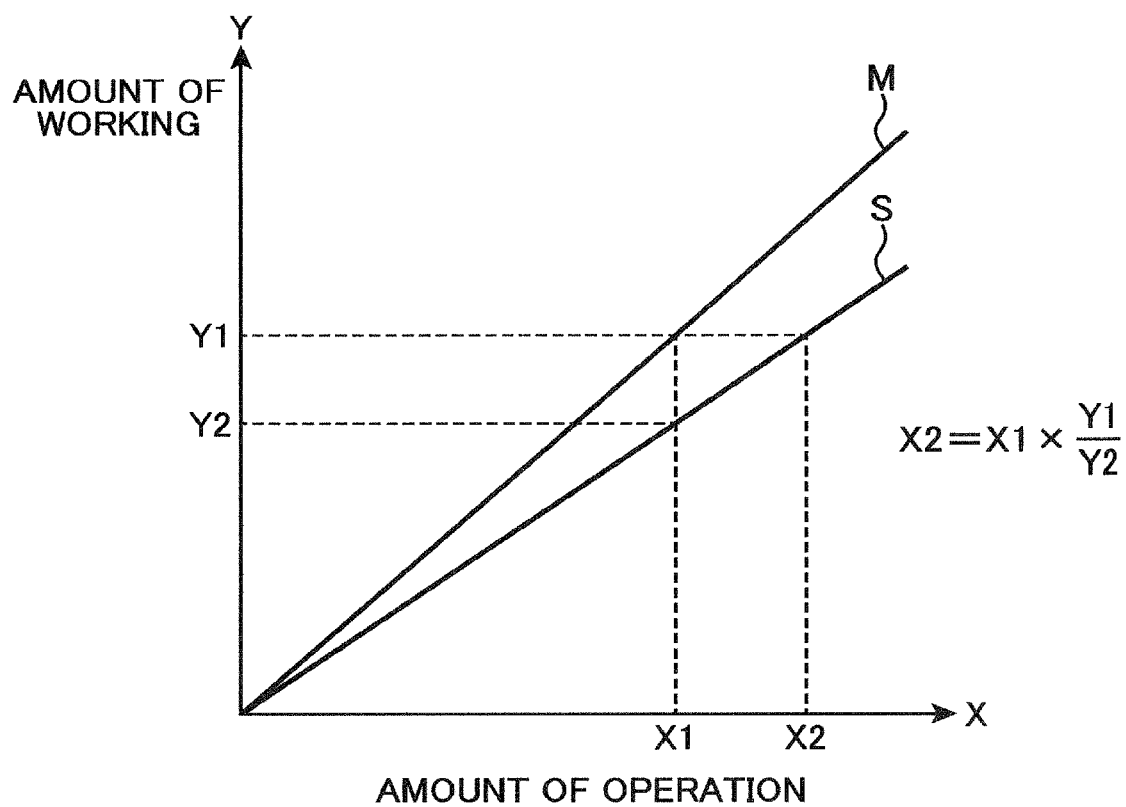
FIG. 4 is a graph showing an operation characteristic of each of a slave and a master.

FIG. 4 is a graph showing an operation characteristic of each of the slave 10 and the master 20. In FIG. 4, the vertical axis represents an amount of working of the construction machine 30 and the horizontal axis represents an amount of operation of the same. The amount of working represents, in a case, for example, of the boom 331 of the construction machine 30, an actual leaning amount of the boom 331 when the boom 331 is caused to go up and down with an amount of operation X. An operation characteristic S represents the operation characteristic of the slave 10 and an operation characteristic M represents the operation characteristic of the master 20. In the example shown in FIG. 4, both the operation characteristics S and M have a characteristics that the amount of working is linearly increased as the amount of operation is increased. In the example shown in FIG. 4, the operation characteristic M inclines largely than the operation characteristic S. In FIG. 4, although the operation characteristic has been described to have a linear characteristic for explanation's sake, the present invention is not limited thereto and the operation characteristic may have a curvilinear characteristic such as a secondary curve or a logarithmic curve.

The operation characteristic M is set to have the same operation characteristic as in the case of directly operating the construction machine 30. Therefore, in a case where the master 20 accepts operation with an amount of operation X1, the construction machine 30 must inherently operate with an amount of working Y1.

However, since the operation characteristic S of the slave 10 does not match the operation characteristic M of the master 20, the slave 10 having accepted an instruction on the amount of operation X1 causes the construction machine 30 to operate with an amount of working Y2 as indicated by the operation characteristic S. This prevents the operator from remotely operating the construction machine 30 with the same operation feeling as in a case of directly operating the construction machine 30.

Here, in the operation characteristic S, an amount of operation corresponding to the amount of working Y1 to be inherently obtained is X2, the construction machine 30 can be operated with the amount of working Y1 by correcting the amount of operation X1 accepted by the master 20 to the amount of operation X2 on the master 20 side and inputting the amount of operation X2 to the slave 10. In other words, the construction machine 30 can be operated with the amount of working Y1 by obtaining the amount of operation X2 based on calculation of X1×(Y1/Y2) and transmitting the amount of operation X2 to the slave 10.

Therefore, in the present embodiment, a correction value (=Y1/Y2) for correcting the amount of operation X1 to the amount of operation X2 is obtained from the operation characteristics of the slave 10 and the master 20 in advance and is registered in the correction table T1.

Figure 5:
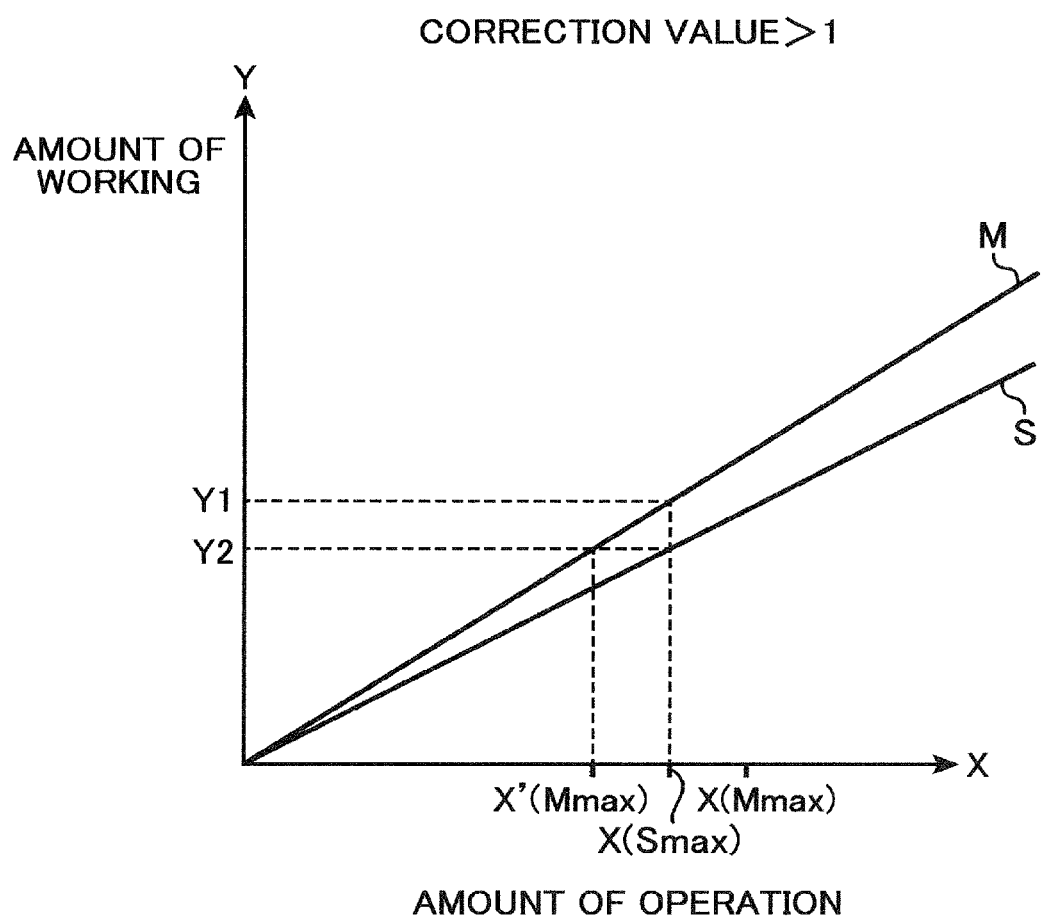
FIG. 5 is a graph showing the operation characteristic of the slave and the operation characteristic of the master for explaining a first example of a regulation value.

FIG. 5 is a graph showing the operation characteristic S of the slave 10 and the operation characteristic M of the master 20 for explaining a first example of a regulation value. In FIG. 5, the vertical axis and the horizontal axis are the same as in FIG. 4. An amount of operation X (Mmax) represents a maximum value of an amount of operation acceptable by the operating lever 23 of the master 20, i.e., a stroke of the operating lever 23.

An amount of operation X (Smax) represents a stroke of the master 20 with which the slave 10 can cope. Specifically, even when an amount of operation larger than the amount of operation X (Smax) is transmitted from the master 20, the slave 10 cannot apply operability larger than the amount of operation X (Smax) to the operating lever 31 of the construction machine 30. In this example, since the operation characteristic M has a larger inclination than the operation characteristic S, the correction value (=Y1/Y2) becomes larger than 1. Additionally, the amount of operation X (Smax) is smaller than the amount of operation X (Mmax). Therefore, when the amount of operation X (Mmax) is corrected by multiplying the amount of operation X (Mmax) by the correction value (=Y1/Y2), a corrected amount of operation X (Mmax)×(Y1/Y2) will become larger than the amount of operation X (Smax).

Therefore, in the present embodiment, an amount of operation X'(Mmax) is obtained in advance which becomes the largest amount of operation X (Smax) acceptable by the slave 10 after the correction, and the amount of operation X'(Mmax) is registered as a regulation value in the correction table T1. The amount of operation X' (Mmax) can be obtained by multiplying X (Smax) by an inverse (=Y2/Y1) of the correction value. This prevents an amount of operation equal to or larger than the amount of operation X (Smax) from being input to the slave 10, thereby preventing operability applied by the slave 10 to the operating lever 31 from being saturated.

Figure 6:
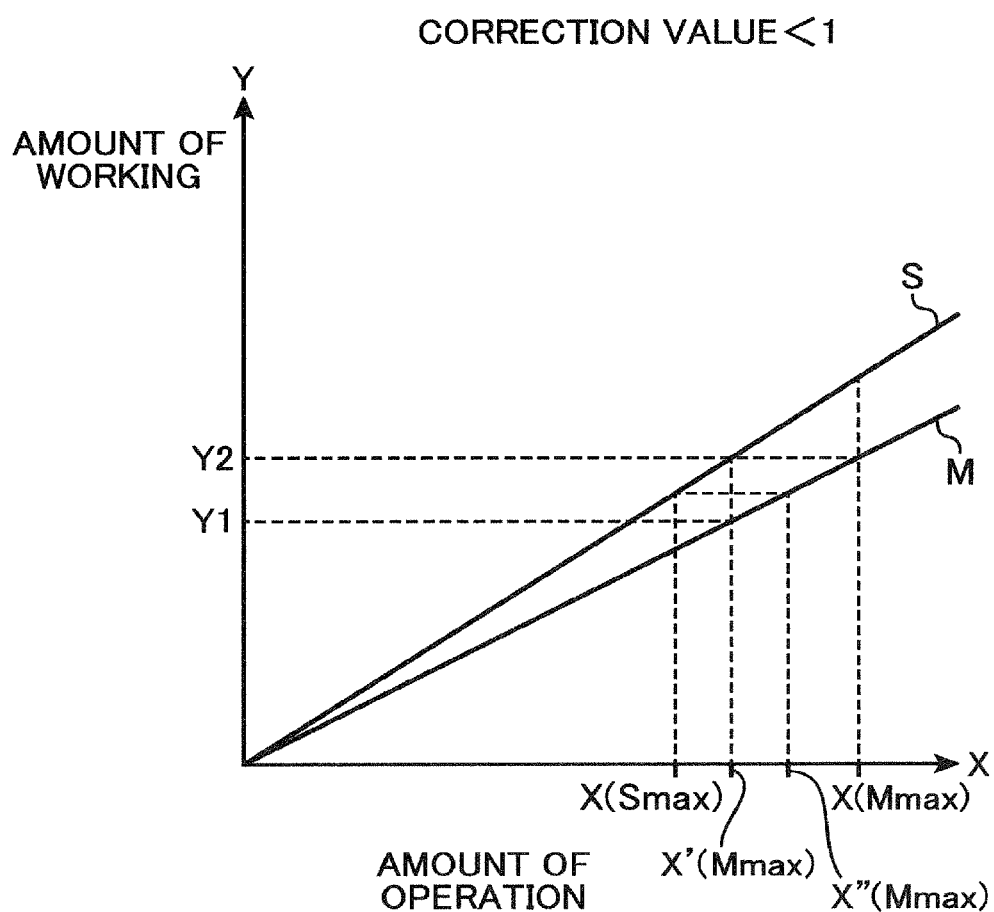
FIG. 6 is a graph showing the operation characteristic of the slave and the operation characteristic of the master for explaining a second example of a regulation value.

FIG. 6 is a graph showing the operation characteristic S of the slave 10 and the operation characteristic M of the master 20 for explaining a second example of a regulation value. In FIG. 6, since the operation characteristic S inclines largely than the operation characteristic M, the correction value (=Y1/Y2) is smaller than 1. Then, the amount of operation X' (Mmax) after correction of the amount of operation X (Mmax) as the stroke of the master 20 by the correction value (=Y1/Y2) becomes larger than the amount of operation X (Smax) as a stroke of the slave 10.

Therefore, in the present embodiment, an amount of operation X"(Mmax) is obtained in advance which becomes the amount of operation X (Smax) as a stroke of the slave 10 after the correction, and the amount of operation X"(Mmax) is registered as a regulation value in the correction table T1. The amount of operation X" (Mmax) can be obtained by multiplying X (Smax) by an inverse (=Y2/Y1) of the correction value. This prevents an amount of operation equal to or larger than the amount of operation X (Smax) from being input to the slave 10, thereby preventing operability applied by the slave 10 to the operating lever 31 from being saturated.

Reference will be returned to FIG. 3. The class table T2 is a table in which the type of the construction machine 30 registered in the correction table T1 and a class are registered in association with each other. Here, the class is represented as a weight of the construction machine 30. The stroke table T3 is a table in which there are registered in association with each other the type of the slave 10 registered in the correction table T1 and the strokes of the slave 10 with which the slave 10 can cope with "front and rear" and "left and right" of the ATT lever 231 and "front and rear" of the travel lever 232 in the master 20. In a case, for example, where while the stroke of "front and rear" of the ATT lever 231 in the master 20 is 20, the ATT lever 311 of the slave 10 has a stroke of 19, a stroke with which the slave 10 can cope will be "19". The class table T2 and the stroke table T3 are tables for use in determining a correction value in a case where a combination pattern of the type information K1 and the type information K2 received by the slave 10 is not registered in the correction table T1. Details will be described later.

Reference will be returned to FIG. 1. The communication ID input unit 25, which is configured with, for example, input devices such as ten keys and a keyboard, accepts operator's input of a communication ID of the slave 10 necessary for establishing communication connection with the slave 10.

The slave 10 is provided with a communication unit 11 (one example of a first communication unit), a controller 12, a memory 13 (one example of a second memory), and an operating mechanism 14.

The communication unit 11, which is configured with a communication device adapted to a communication method adopted by the communication path 100, transmits the type information of the construction machine 30 and the type information of the slave 10 to the master 20.

The controller 12 is configured with a computer including a processor such as CPU or ASIC and storage devices such as ROM and RAM. When the communication unit 11 receives an acquisition request from the master 20, the controller 12 reads the type information K1 of the construction machine 30 and the type information K2 of the slave 10 from the memory 13 and causes the communication unit 11 to transmit the type information.

The memory 13, which is configured with a non-volatile memory, stores in advance type information of a construction machine to which the slave 10 is attached and the type information of the slave 10 itself. Here, the type information of the slave 10 is input in advance to the memory 13 in the process of manufacture of the slave 10. The type information of the construction machine 30 has been input by a worker when attaching the slave 10 to the construction machine 30.

The operating mechanism 14, which is configured with an actuator, receives input of a control signal for generating operability according to an amount of operation received by the communication unit 11, generates operability according to an amount of operation, and applies the generated operability to the operating lever 31 of the construction machine 30. In FIG. 1, since the construction machine 30 is provided with the ATT lever 311 and the travel lever 312, the slave 10 is provided with an operating mechanism 14A corresponding to the ATT lever 311 and an operating mechanism 14B corresponding to the travel lever 312. Additionally, since the ATT lever 311 is operable in the "front and rear" directions and the "left and right" directions, the operating mechanism 14A is provided with an actuator corresponding to the "front and rear" directions and an actuator corresponding to the "left and right" directions.

In a case where the communication unit 11 receives an amount of operation of the ATT lever 231, the controller 12 outputs a control signal according to the amount of operation to the operating mechanism 14A, and in a case where the communication unit 11 receives an amount of operation of the travel lever 232, the controller 12 outputs a control signal according to the amount of operation to the operating mechanism 14B. This makes the slave 10 be a dummy of an operator who operates the master 20 and directly operate the construction machine 30.

The construction machine 30 is provided with the operating lever 31 (one example of an operation member). The operating lever 31 is provided with an MT lever 311 and a travel lever 312. The operating lever 31 is provided at the operator seat of the construction machine 30 and is leaned upon application of operability from the slave 10. Similarly to the ATT lever 231, the ATT lever 311 is configured with an operating lever capable of leaning in four directions of front, rear, left, and right. When leaned forward or backward, the ATT lever 311 causes the boom 331 to go down or go up, and when operated in the left or right direction, causes the attachment 333 to swing. When leaned forward, the travel lever 232 causes the construction machine 30 to advance and when leaned backward, causes the construction machine 30 to retract.

Figure 7:
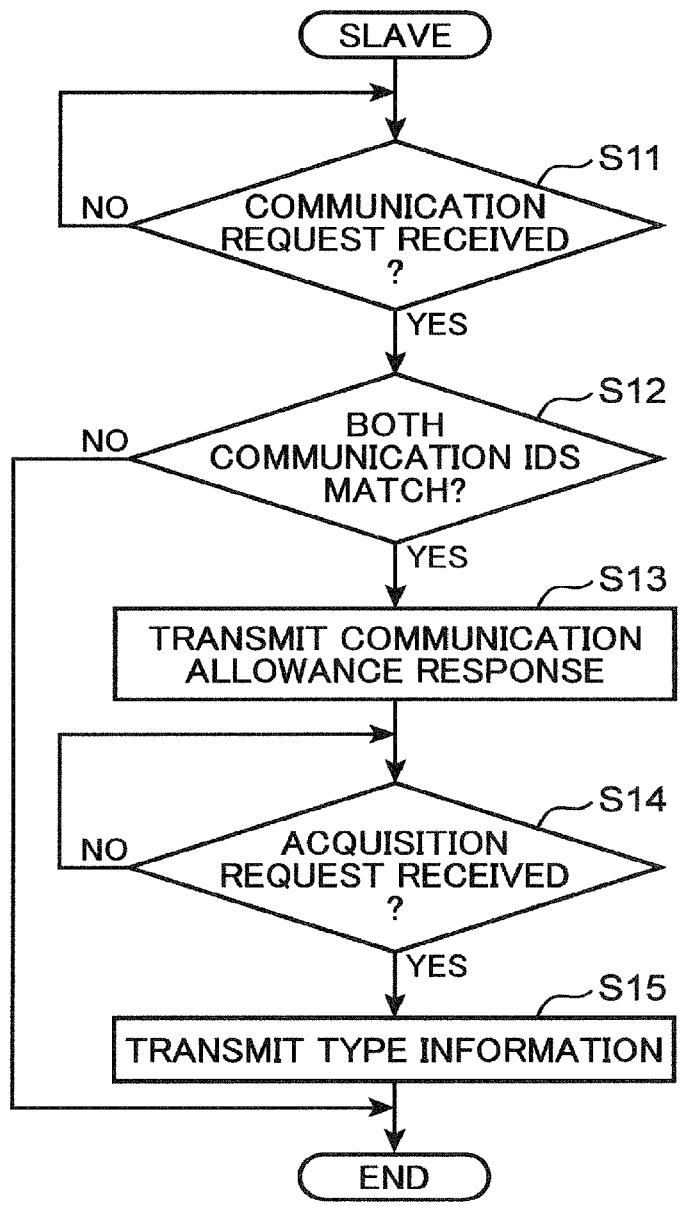
FIG. 7 is a flow chart showing processing of the slave shown in FIG. 1.

FIG. 7 is a flow chart showing processing of the slave shown in FIG. 1. In S11, when the communication unit 11 receives a communication request transmitted from the master 20 (YES in S11), the processing proceeds to S12, and in a case of not receiving a communication request (NO in S11), the processing returns to S11. Here, the communication request includes a communication ID of the slave 10 input by the communication ID unit 25.

In S12, the controller 12 conducts identification processing of determining whether the communication ID included in the communication request matches the communication ID of the slave 10 stored in advance in the memory 13 or not. In a case where both the communication IDs match with each other (YES in S12), determination is made that identification is allowed to cause the processing to proceed to S13, and in a case where the communication IDs fail to match with each other (NO in S12), determination is made that identification fails to end the processing. Here, since a regular operator of the master 20 is informed of the communication ID of the slave 10 as a communication target in advance, the operator can input the communication Ill of the slave 10 using the communication ID input unit 25. On the other hand, an unauthorized operator does not know the communication ID of the slave 10 as a communication target and cannot input the communication ID of the slave 10. This arrangement prevents an unauthorized operator from remotely controlling the construction machine 30.

In S13, the controller 12 transmits a communication allowance response to the master 20 via the communication unit 11. The master 20 having received the communication allowance response transmits an acquisition request for the type information K1 and K2, and in a case where the communication unit 11 receives the acquisition request (YES in S14), the controller 12 reads the type information K1 and K2 from the memory 13 and transmits the read information to the master 20 via the communication unit 11 (S15). On the other hand, in a case where the acquisition request is not received by the communication unit 11 (NO in S14), the processing is held. In a case where the identification fails in S12 (NO in S12), the controller 12 may transfer a communication refusal response indicative of a failure of the identification to the communication unit 11, and the communication unit 11 may transmit the communication refusal response to the master 20 via the communication path 100.

Figure 8:
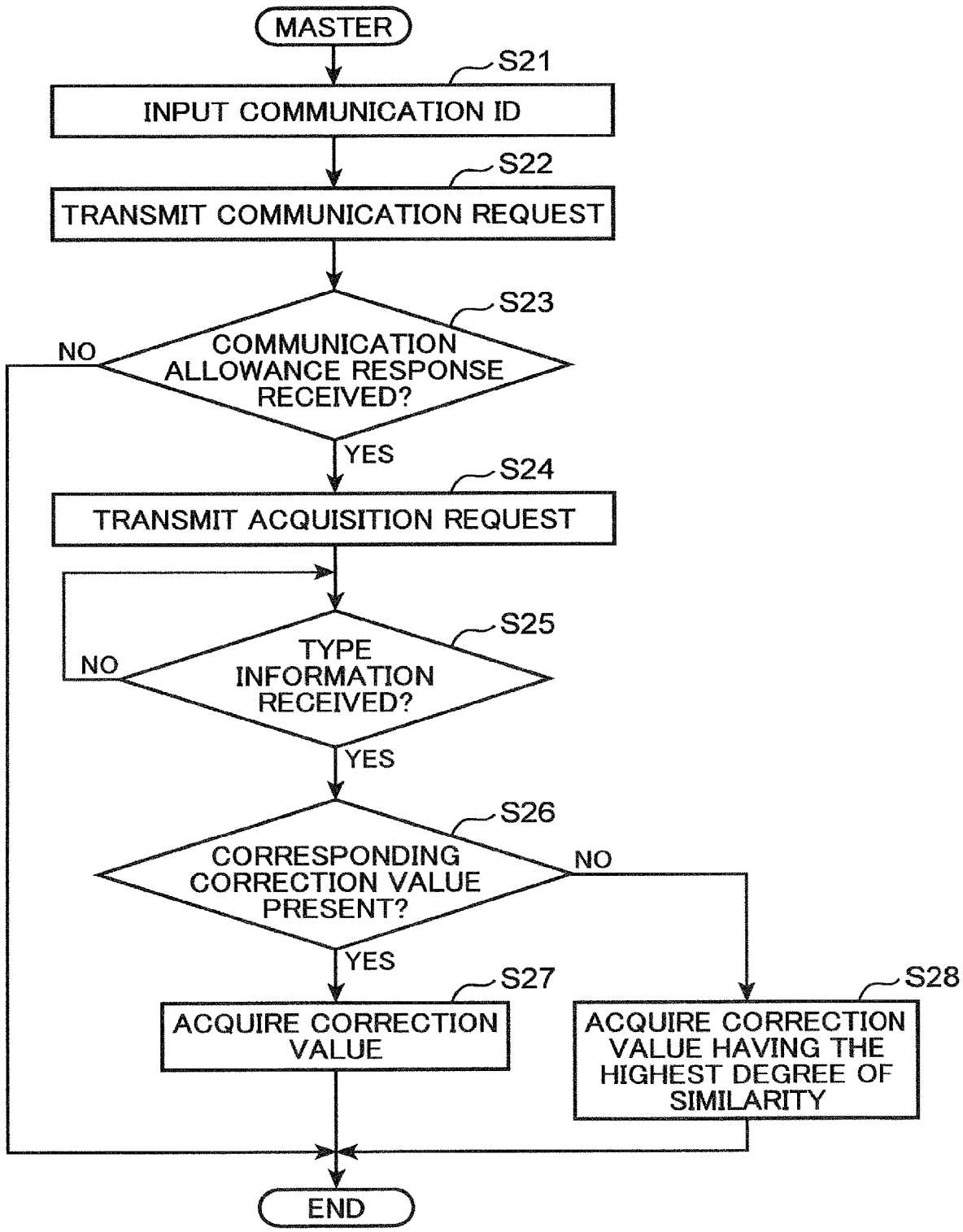
FIG. 8 is a flow chart showing processing of the master shown in FIG. 1.

FIG. 8 is a flow chart showing processing of the master 20 shown in FIG. 1. In S21, the communication ID input unit 25 accepts the communication ID of the slave 10 input by the operator. In S22, the controller 22 generates a communication request including the communication ID accepted by the communication ID input unit 25 and transfers the communication request to the communication unit 21, so that the communication unit 21 transmits the communication request to the slave 10 via the communication path 100.

In S23, the controller 22 determines whether a communication allowance response transmitted from the slave 10 having the communication request is received by the communication unit 21 or not. Here, in a case of receiving the communication allowance response from the slave 10 within a predetermined time period after the transmission of the communication request, the controller 22 determines YES in S23 to cause the processing to proceed to S24, and in a case of not receiving the communication allowance response from the slave 10 within the predetermined time period, determines No in S23 to cause the processing to end. In a case of adopting a mode in which the slave 10 transmits the communication refusal response, when the communication unit 21 receives the communication refusal response, the controller 22 may determine No in S23 to cause the processing to end.

In S24, the controller 22 generates an acquisition request for acquiring the type information K1 and K2 from the slave 10 and transfers the generated acquisition request to the communication unit 21, so that the communication unit 21 transmits the acquisition request to the slave 10 via the communication path 100.

In S25, the controller 22 determines whether the type information K1 and K2 transmitted from the slave 10 having received the acquisition request is received by the communication unit 21 or not. In a case where the communication unit 21 has received the type information K1 and K2 (YES in S25), the controller 22 determines whether a correction value corresponding to a combination pattern of a "type" included in the type information K1 and a "type" included in the type information K2 is registered in the correction table T1 or not. In a case where such a correction value for the relevant pattern is registered in the correction table T1 (YES in S26), the controller 22 acquires the relevant correction value from the correction table T1 (S27).

With reference to FIG. 3, it is assumed, for example, that the type information K1 transmitted from the slave 10 includes a type "Z1" and the type information K2 transmitted from the slave 10 includes a type "S01", a correction value corresponding to the combination pattern "1" is acquired from the correction table T1.

On the other hand, with reference to FIG. 8, in a case where a correction value corresponding to a combination pattern of a "type" included in the type information K1 and a "type" included in the type information K2 is not registered in the correction table T1 (NO in S26), the controller 22 acquires a correction value having the highest degree of similarity to the combination pattern from the correction table T1 (S28).

Here, in a case where the type information K1 includes class information indicative of a class of the construction machine 30 to which the slave 10 is attached, the controller 22 refers to the class table T2 to specify a type of a class having the highest degree of similarity to the class of such construction machine 30. For example, in a case where "32t" is included as class information in the type information K1, since the construction machine 30 of a class "30t" has the highest degree of similarity in the class table T2, the type "Z1" is specified from the class table T2.

Here, as a degree of similarity of a class, for example, an inverse of a difference can be adopted, the difference being between a class indicated by class information included in the type information K1 and a class registered in the class table T2.

When the type information K2 includes stroke information indicating strokes of various kinds of operating levers in the slave 10, the controller 22 specifies a type of the slave 10 having the highest degree of similarity of a stroke from the stroke table T3. It is assumed, for example, that the type information K2 includes "20" in the front and rear and "20" in the left and right as a stroke of the ATT lever 311 and "30" in the front and rear as a stroke of the travel lever. In this case, since the slave 10 of the type "S01" having "19" in the front and rear and "19" in the left and right as the stroke of the ATT lever 311 and having "28" in the front and rear as the stroke of the travel lever has the highest degree of similarity in the stroke table T3, the type "S01" is specified. Here, as a degree of similarity of a stroke, for example, an inverse of an addition value of differences between elements can be adopted, the elements corresponding to a stroke included in the type information K2 and to a stroke registered in the stroke table T3.

Then, when a correction value for a combination pattern of a type having the highest degree of similarity of a class and a type having the highest degree of similarity of a stroke is registered in the correction table T1, the controller 22 acquires the correction value from the correction table T1.

In the previous example, since the type "Z1" has the highest degree of similarity of a class and the type "S01" has the highest degree of similarity of a stroke, a correction value for the combination pattern "1" is acquired from the correction table T1.

On the other hand, it is assumed that the correction value for the combination pattern of the type having the highest degree of similarity of a class and the type having the highest degree of similarity of a stroke is not registered in the correction table T1. In this case, the controller 22 need only extract combination patterns including types having the highest degrees of similarity of a class from the correction table T1 and acquire a correction value for a combination pattern having the highest degree of similarity of a stroke among the extracted combination patterns. Alternatively, the controller 22 may extract combination patterns including types having the highest degree of similarity of a stroke from the correction table T1 and acquire a correction value for a combination pattern having the highest degree of similarity of a class among the extracted combination patterns.

Hereinafter, every time the operating lever 23 is operated, the controller 22 corrects the amount of operation of the operating lever 23 by using a correction value and transmits the corrected amount of operation to the slave 10 to cause the operator to remotely operate the construction machine 30.

Thus, according to the present embodiment, the master 20 can correct the amount of operation so that the operation characteristic of the master 20 matches the operation characteristic of the slave 10 and transmit the corrected amount of operation to the slave 10. As a result, in a case where the slave 10 that is not a set with the master 20 is attached to the construction machine 30, the operator is allowed to remotely operate the construction machine 30 with the same operation feeling as in a case of directly operating the construction machine 30, without requiring troublesome adjustment work on the slave 10 side.

Also according to the present embodiment, since it is not necessary to replace the master 20 according to the slave 10, an operator need only develop an operation skill for one master 20, the need of developing operation skills for various types of the master 20 will be eliminated.

Additionally, since a rental agent can rent, to the user having the master 20, the construction machine 30 to which the slave 10 not being a set with the master 20 owned by the user is attached, it will be unnecessary to prepare the slaves 10 of various models in advance.

The present invention can adopt the following modifications.

(1) Although in the above-described embodiment, a correction value is calculated based on inclinations of an operation characteristic of the slave 10 and of an operation characteristic of the master 20, the present invention is not limited thereto. In a case, for example, an operation characteristic of the slave 10 and an operation characteristic of the master deviate from each other in a direction of an amount of working, an offset value indicative of the deviation may be adopted as a correction value. In this case, if the offset value varies with a range of an amount of operation, the correction table T1 need only register a correction value for each range of an amount of operation.

(2) Although in the above-described embodiment, a hydraulic excavator has been described as an example of the construction machine 30, the present invention is not limited thereto, and a construction machine such as a hydraulic crane or a bulldozer may be adopted.

(3) Although in the above-described embodiment, the ATT lever 231 and the ATT lever 311 have been described to each operate the boom 331 and the attachment 333, the present invention is not limited thereto. For example, the operating lever 23 and the operating lever 31 may each include operating levers individually operating the boom 331 and the attachment 333.

(4) Although in the above-described embodiment, the operating lever is illustrated as an operation member, the present invention is not limited thereto, and the operation member may be configured with a pedal or a dial operation member.

Figure 9:
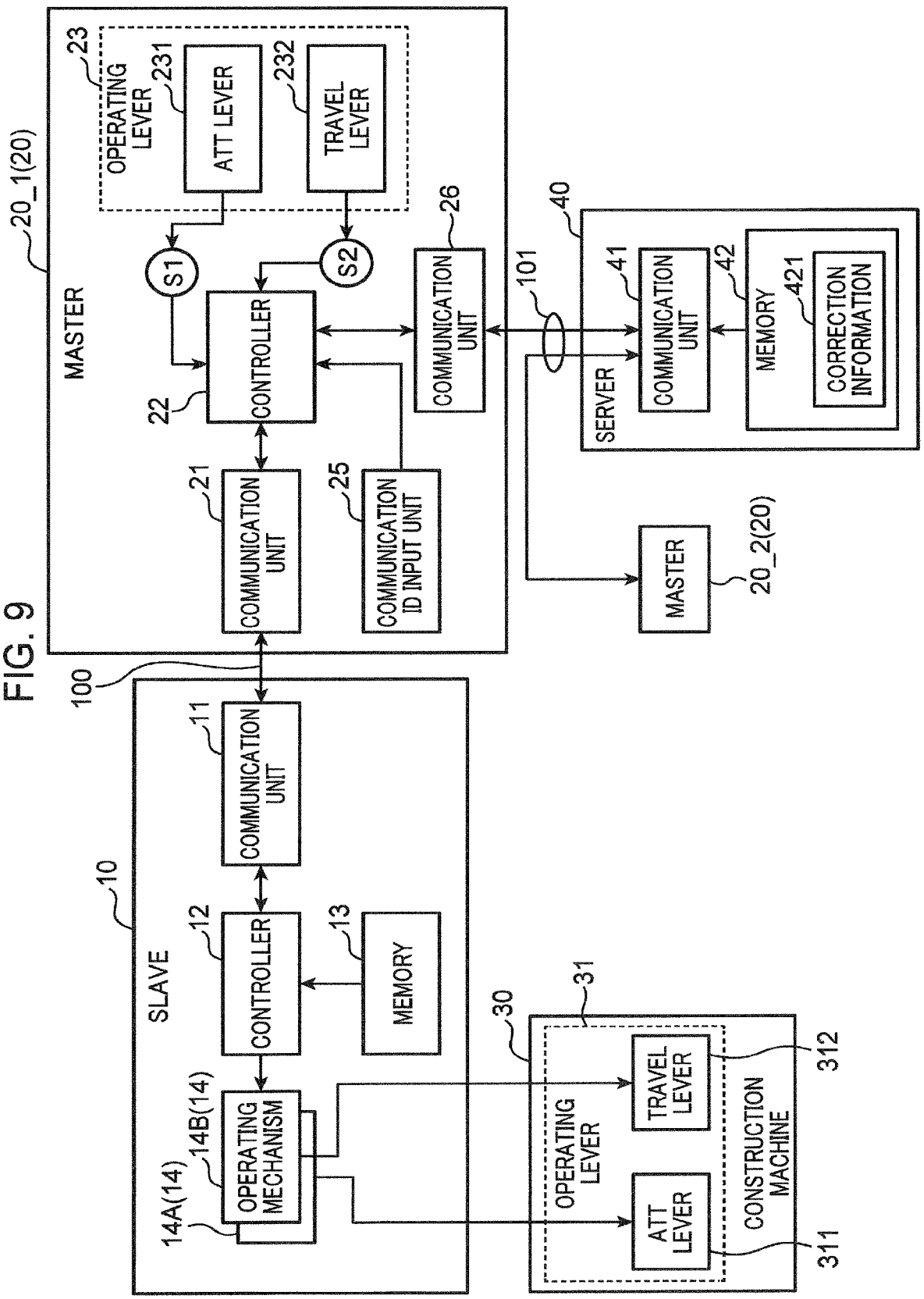
FIG. 9 is a block diagram showing an overall configuration of a remote operation system according to a modification of the present embodiment.

(5) Although in the flow shown in FIG. 8, the controller 22 acquires a relevant correction value from the correction table T1 stored in the memory 24 in S27, the present invention is not limited thereto, and the controller 22 may acquire the correction value from the server. FIG. 9 is a block diagram showing an overall configuration of a remote operation system according to a modification of the present embodiment. In the modification shown in FIG. 9, a server 40 is further added and the master 20 is configured with a plurality of masters 20_1 and 20_2. Since the masters 20_1 and 20_2 have the same configuration, description will be made only of the master 20_1 in the following.

The server 40 is configured with a computer and is provided with a communication unit 41 and a memory 42. The communication unit 41, which is configured with a communication device adapted to a communication method adopted by a communication path 101, connects the server 40 to the masters 20_1 and 20_2 via the communication path 101. As the communication path 101, public communication lines including a cellular phone communication network, the Internet communication network, and the like can be adopted.

The memory 42 is configured with a non-volatile memory and stores correction information 421. The correction information 421 has the same content as the correction information 241, i.e., is provided with the correction table T1, the class table T2, and the stroke table T3 shown in FIG. 3. Here, in a case where the correction information 421 is changed, the server 40 updates the correction information 421 with the changed contents, thereby collectively managing the correction information 421.

The master 20_1 is further provided with a communication unit 26 in addition to the configuration shown in FIG. 1 and has the memory 24 omitted. Specifically, in S26 of FIG. 8, the master 20_1 transmits, to the server 40, an acquisition request for a correction value including the type information K1 and K2 transmitted from the slave 10, and in a case where a correction value corresponding to the type information K1 and K2 is stored in the server 40 (YES in S26), the master 20_1 acquires the relevant correction value from the server 40 (S27).

On the other hand, in a case where the relevant correction value is not stored in the server 40 (NO in S26), similarly to the master 20_1, the server 40 determines a correction value having the highest degree of similarity to a combination pattern of a "type" included in the type information K1 and a "type" included in the type information K2 from the correction table T1 and transmits the determined correction value to the master 20_1 (S28).

Thus, since in the modification, the correction information 421 is collectively managed by the server 40, and the masters 20_1 and 20_2 are connected to the server 40, even when a new combination pattern is added, latest correction information 421 can be immediately reflected in all the masters 20_1 and 20_2. While in FIG. 9, the description has been made of a case of two masters 20, the masters may be three or more. Additionally, although the memory 24 is omitted from the masters 20_1 and 20_2, the memories 24 may be provided in the masters 20_1 and 20_2 such that when updating the correction information 421, the server 40 may quickly transmit the updated correction information 421 to the masters 20_1 and 20_2.

(Summarization of Embodiments)

Technical features of the present embodiments will be summarized below.

A remote operation system according to one aspect of the present invention is a remote operation system which remotely operates a construction machine provided with an operation member, the remote operation system including: a main operating device which remotely operates the construction machine; and a slave operating device communicably connected to the main operating device, in which the slave operating device includes: a first communication unit which transmits type information of the construction machine and type information of the slave operating device to the main operating device and receives an amount of operation transmitted from the main operating device; and an operating mechanism which directly operates the operation member of the construction machine based on an amount of operation received by the first communication unit, and in which the main operating device includes a second communication unit which receives the type information of the construction machine and the type information of the slave operating device transmitted from the slave operating device; a first memory which stores correction information having a correction value registered in association with a combination pattern of the type information of the construction machine and the type information of the slave operating device, the correction value being for matching an operation characteristic of the slave operating device with an operation characteristic of the main operating device; a remote operation member which accepts operation from an operator; and a controller which acquires, from the correction information, a correction value corresponding to a combination pattern of the type information of the construction machine and the type information of the slave operating device received by the second communication unit, corrects an amount of operation accepted by the remote operation member based on the acquired correction value, and causes the second communication unit to transmit the amount of operation.

According to the present configuration, the main operating device is provided with the correction information having a correction value registered in association with a combination pattern of the type information of the construction machine and the type information of the operating device, the correction value being for matching an operation characteristic of the slave operating device with an operation characteristic of the main operating device. Then, when receiving the type information of the construction machine on which the slave operating device is mounted and the type information of the slave operating device from the slave operating device, the main operating device acquires a correction value corresponding to a combination pattern of both the type information from the correction information, corrects an amount of operation input by an operator based on the acquired correction value, and transmits the corrected amount of operation to the slave operating device. Accordingly, the main operating device can transmit, to the slave operating device, an amount of operation after being corrected so that the operation characteristic of the slave operating device matches the operation characteristic of the main operating device.

As a result, in a case where a slave operating device not being a set with a main operating device is attached to a construction machine, the operator is allowed to remotely operate the construction machine with the same operation feeling as in a case of directly operating the construction machine, without requiring troublesome adjustment work on the slave operating device side.

Additionally, according to the present configuration, replacement of the main operating device according to the slave operating device is not required, so that the main operating device adapted to various types of main operating devices can be provided.

Additionally, since a rental agent can rent, to a user having the master, a construction machine to which a slave operating device not being a set with a main operating device owned by the user is attached, it will be unnecessary to prepare slave operating devices of various models in advance.

In the above configuration, the main operating device preferably further includes a first memory which stores the correction information.

According to the present configuration, the main operating device can quickly acquire correction information from the local first memory.

In the above configuration, the remote operation system preferably further includes a server which stores the correction information.

According to the present configuration, since the server collectively manages correction information, even when the correction information is updated, latest correction information can be reflected in all the masters.

In the above configuration, preferably, the slave operating device further includes a second memory which in advance stores the type information of the construction machine and the type information of the slave operating device, and when receiving an acquisition request for the type information of the construction machine and the type information of the slave operating device from the main operating device, the first communication unit transmits the type information of the construction machine and the type information of the slave operating device stored in the second memory to the main operating device.

According to the present configuration, since the slave operating device in advance stores the type information of the construction machine to which the slave operating device itself is attached and its own type information, upon an acquisition request for type information from the main operating device, the slave operating device can quickly and accurately transmit the type information to the main operating device.

In the above configuration, the correction information preferably has a regulation value registered in advance, the regulation value regulating a stroke of the remote operation member to prevent an amount of operation larger than a maximum value of an amount of operation that can be coped with by the operating mechanism of the slave operating device from being input to the slave operating device.

According to the present configuration, a stroke of the remote operation member of the main operating device can be regulated such that operability which is applied by the slave operating device to the operation member of the construction machine is not saturated.

The invention claimed is:

1. A remote operation system that remotely operates a construction machine provided with an operation member, the remote operation system comprising:
   a main operating device that includes a remote operation member for accepting operation from an operator and remotely operates the construction machine; and
   a slave operating device communicably connected to the main operating device,
   wherein
      the slave operating device includes:
         a first communication unit that transmits type information for specifying a model of the construction machine and type information for specifying a model of the slave operating device to the main operating device and receives an operation instruction of the remote operation member transmitted from the main operating device, and
         an operating mechanism that directly operates the operation member of the construction machine based on an operation instruction received by the first communication unit, and
      the main operating device further includes:
         a second communication unit that receives the type information for specifying the model of the construction machine and the type information for specifying the model of the slave operating device transmitted from the slave operating device, and
         a controller that acquires, from correction information, a correction value corresponding to a combination pattern of the type information for specifying the model of the construction machine and the type information for specifying the model of the slave operating device received by the second communication unit for matching an operation characteristic of the slave operating device with an operation characteristic of the main operating device, corrects an operation instruction accepted by the remote operation member based on the acquired correction value, and causes the second communication unit to transmit the operation instruction to the slave operating device, and
      the correction information having the correction value registered in association with a combination pattern of the type information for specifying the model of the construction machine and the type information for specifying the model of the slave operating device.

2. The remote operation system according to claim 1, wherein the main operating device further includes a first memory that stores the correction information.

3. The remote operation system according to claim 1, further comprising a server that stores the correction information.

4. The remote operation system according to claim 1, wherein
   the slave operating device further includes a second memory that in advance stores the type information for specifying the model of the construction machine and the type information for specifying the model of the slave operating device, and
   when receiving an acquisition request for the type information for specifying the model of the construction machine and the type information for specifying the model of the slave operating device from the main operating device, the first communication unit transmits the type information for specifying the model of the construction machine and the type information for specifying the model of the slave operating device stored in the second memory to the main operating device.

5. The remote operation system according to claim 1, wherein the correction information has a regulation value registered in advance, the regulation value regulating a stroke of the remote operation member to prevent an operation instruction larger than a maximum value of an operation instruction that can be coped with by the operating mechanism of the slave operating device from being input to the slave operating device.

6. A main operating device communicably connected to a slave operating device that directly operates an operation member of a construction machine in order to remotely operate the construction machine, the main operating device comprising:
   a communication unit that receives type information for specifying a model of the construction machine and type information for specifying a model of the slave operating device transmitted from the slave operating device;
   a remote operation member that accepts operation from an operator; and a controller that acquires, from correction information, a correction value corresponding to a combination of the type information for specifying the model of the construction machine and the type information for specifying the model of the slave operating device received by the communication unit for matching an operation characteristic of the slave operating device with an operation characteristic of the main operating device, corrects an operation instruction accepted by the remote operation member based on the acquired correction value, and causes the communication unit to transmit the operation instruction to the slave operating device, wherein the correction information has the correction value registered in association with a combination pattern of the type information for specifying the model of the construction machine and the type information for specifying the model of the slave operating device.

* * * * *